United States Patent
Tsirkin

(10) Patent No.: US 9,766,917 B2
(45) Date of Patent: Sep. 19, 2017

(54) LIMITED VIRTUAL DEVICE POLLING BASED ON VIRTUAL CPU PRE-EMPTION

(71) Applicant: Red Hat Israel, LTD, Raanana (IL)

(72) Inventor: Michael S. Tsirkin, Yokneam Illit (IL)

(73) Assignee: Red Hat Israel, Ltd., Raanana (IL)

( * ) Notice: Subject to any disclaimer, the term of this patent is extended or adjusted under 35 U.S.C. 154(b) by 11 days.

(21) Appl. No.: 14/527,661

(22) Filed: Oct. 29, 2014

(65) Prior Publication Data

US 2016/0124763 A1 May 5, 2016

(51) Int. Cl.
| | | |
|---|---|---|
| G06F 9/44 | (2006.01) | |
| G06F 9/455 | (2006.01) | |
| G06F 9/50 | (2006.01) | |
| G06F 9/54 | (2006.01) | |
| G06F 11/34 | (2006.01) | |
| G06F 11/36 | (2006.01) | |

(52) U.S. Cl.
CPC ........ G06F 9/45558 (2013.01); G06F 9/5077 (2013.01); G06F 9/5088 (2013.01); G06F 9/544 (2013.01); *G06F 11/3419* (2013.01); *G06F 11/3466* (2013.01); *G06F 11/3688* (2013.01); *G06F 2009/45579* (2013.01); *G06F 2209/5022* (2013.01)

(58) Field of Classification Search
CPC ............. G06F 11/3419; G06F 11/3466; G06F 11/3688; G06F 2201/865
See application file for complete search history.

(56) References Cited

U.S. PATENT DOCUMENTS

| | | | |
|---|---|---|---|
| 7,765,543 B1 * | 7/2010 | Weissman | G06F 9/485 714/48 |
| 8,171,488 B1 | 5/2012 | Waldspurger et al. | |
| 8,464,022 B2 | 6/2013 | Devine et al. | |
| 8,645,657 B2 | 2/2014 | Colgrove et al. | |
| 9,323,553 B2 * | 4/2016 | Larson | G06F 9/45533 |
| 9,378,162 B2 * | 6/2016 | Jebson | G06F 13/24 |

(Continued)

OTHER PUBLICATIONS

Uhlig et al., "Towards Scalable Multiprocessor Virtual Machines", USENIX, VM'04, May 2004, 3rd Virtual Machine Research & Technology Symposium, pp. 1-15; <https://www.usenix.org/event/vm04/tech/full_papers/uhlig/uhlig.pdf>.*

(Continued)

*Primary Examiner* — Thuy Dao
*Assistant Examiner* — Ben C Wang
(74) *Attorney, Agent, or Firm* — Lowenstein Sandler LLP

(57) ABSTRACT

A hypervisor executing on a computer system identifies a request of a guest operating system of a virtual machine associated with a shared device. The shared device comprises a shared memory space between a virtual processor of the virtual machine and the hypervisor and the virtual machine has a plurality of virtual processors. The hypervisor processes the request of the guest operating system and polls the shared device for additional requests of the guest operating system. Upon determining that there are no additional requests associated with the shared device to be processed, the hypervisor determines the execution state of each virtual processor of the virtual machine. The hypervisor disables polling the shared device for requests upon determining that at least one of the plurality of virtual processors has been pre-empted.

15 Claims, 4 Drawing Sheets

(56) References Cited

U.S. PATENT DOCUMENTS

| | | | |
|---|---|---|---|
| 2010/0274890 A1 | 10/2010 | Patel et al. | |
| 2012/0036292 A1* | 2/2012 | Anand et al. | 710/47 |
| 2012/0089980 A1* | 4/2012 | Sharp | G06F 9/45558 718/1 |
| 2013/0060837 A1* | 3/2013 | Chakraborty | G06F 3/14 709/203 |
| 2013/0138760 A1* | 5/2013 | Tsirkin | 709/213 |
| 2013/0139156 A1 | 5/2013 | Tsirkin | |
| 2013/0275972 A1 | 10/2013 | Sawa et al. | |
| 2013/0282994 A1 | 10/2013 | Wires et al. | |
| 2014/0068603 A1* | 3/2014 | Tsirkin et al. | 718/1 |
| 2014/0245295 A1* | 8/2014 | Tsirkin et al. | 718/1 |
| 2014/0351471 A1* | 11/2014 | Jebson | G06F 13/24 710/269 |
| 2014/0380309 A1* | 12/2014 | Kobayashi | G06F 9/45558 718/1 |
| 2015/0026687 A1* | 1/2015 | Yim | G06F 9/522 718/102 |
| 2015/0081943 A1* | 3/2015 | Larson | G06F 9/45533 710/264 |
| 2015/0220354 A1* | 8/2015 | Nair | 710/47 |
| 2015/0248303 A1* | 9/2015 | Noel | G06F 9/4856 718/1 |
| 2015/0339216 A1* | 11/2015 | Wade | G06F 11/3688 714/38.1 |
| 2015/0347166 A1* | 12/2015 | Noel | G06F 11/3495 718/1 |
| 2015/0347169 A1* | 12/2015 | Tsirkin | 709/213 |
| 2016/0077571 A1* | 3/2016 | Sagar | G06F 1/3206 713/340 |
| 2016/0154710 A1* | 6/2016 | Wade | G06F 11/1469 714/19 |
| 2017/0091047 A1* | 3/2017 | Bangalore | G06F 11/1451 |

OTHER PUBLICATIONS

Liu et al., "Virtualization Polling Engine (VPE): Using Dedicated CPU Cores to Accelerate I/O Virtualization", ACM, ICS'09, Jun. 2009, pp. 225-234; <http://dl.acm.org/citation.cfm?id=1542309&CFID=761601880&CFTOKEN=98351079>.*

Guan et al., "SR-IOV Based Network Interrupt-Free Virtualization with Event Based Polling", IEEE, Dec. 2013, vol. 31, No. 12, pp. 2596-2609; <http://ieeexplore.ieee.org/stamp/stamp.jsp?tp=&arnumber=6678107>.*

Alex Landau et al. "SplitX: Split Guest/Hypervisor Execution on Multi-Core," Retrieved from the Internet on Oct. 29, 2014, 7 pages, World Wide Web, http://static.usenix.org/event/wiov11/tech/final_files/Landau.pdf.

Ruo Ando et al., "Inter-Domain Communication Protocol for Real-time File Access Monitor of Virtual Machine," Journal of Wireless Mobile Networks, Ubiquitous Computing, and Dependable Applications, Retrieved from the Internet on Oct. 29, 2014, pp. 120-137, vol. 3, No. 1/2, World Wide Web, http://isyou.info/jowua/papers/jowua-v3n12-8.pdf.

Diwaker Gupta et al., "Enforcing Performance Isolation Across Virtual Machines in Xen," Retrieved from the Internet on Oct. 29, 2014, 20 pages, World Wide Web, http://cseweb.ucsd.edu/~vahdat/papers/xenqos-mware.pdf.

Irfan Ahmad et al., "vIC: Interrupt Coalescing for Virtual Machine Storage Device IO" Paper from VMware, Inc., Retrieved from the Internet on Oct. 29, 2014, 14 pages, World Wide Web, https://www.usenix.org/legacy/event/atc11/tech/final_files/Ahmad.pdf.

* cited by examiner

LIMITED VIRTUAL DEVICE POLLING BASED ON VIRTUAL CPU PRE-EMPTION

TECHNICAL FIELD

The present disclosure is generally related to computer systems, and more particularly, to shared device polling in virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system of the host machine is typically referred to as the "host operating system." Typically, software on the host machine known as a "hypervisor" (or a "virtual machine monitor") manages the execution of one or more virtual machines, providing a variety of functions such as virtualizing and allocating resources, context switching among virtual machines, etc. A virtual machine may comprise one or more "virtual processors," each of which maps, possibly in a many-to-one fashion, to a central processing unit (CPU) of the host machine.

When a guest operating system running within a virtual machine needs to execute a privileged operation (such as an I/O instruction to a physical storage device attached to the host hardware), one way of doing so can be by writing requests to a virtual shared device based on shared memory. The host operating system typically accesses the shared memory to determine whether there are any requests pending from the guest operating system, which is referred to as "polling" the shared device.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
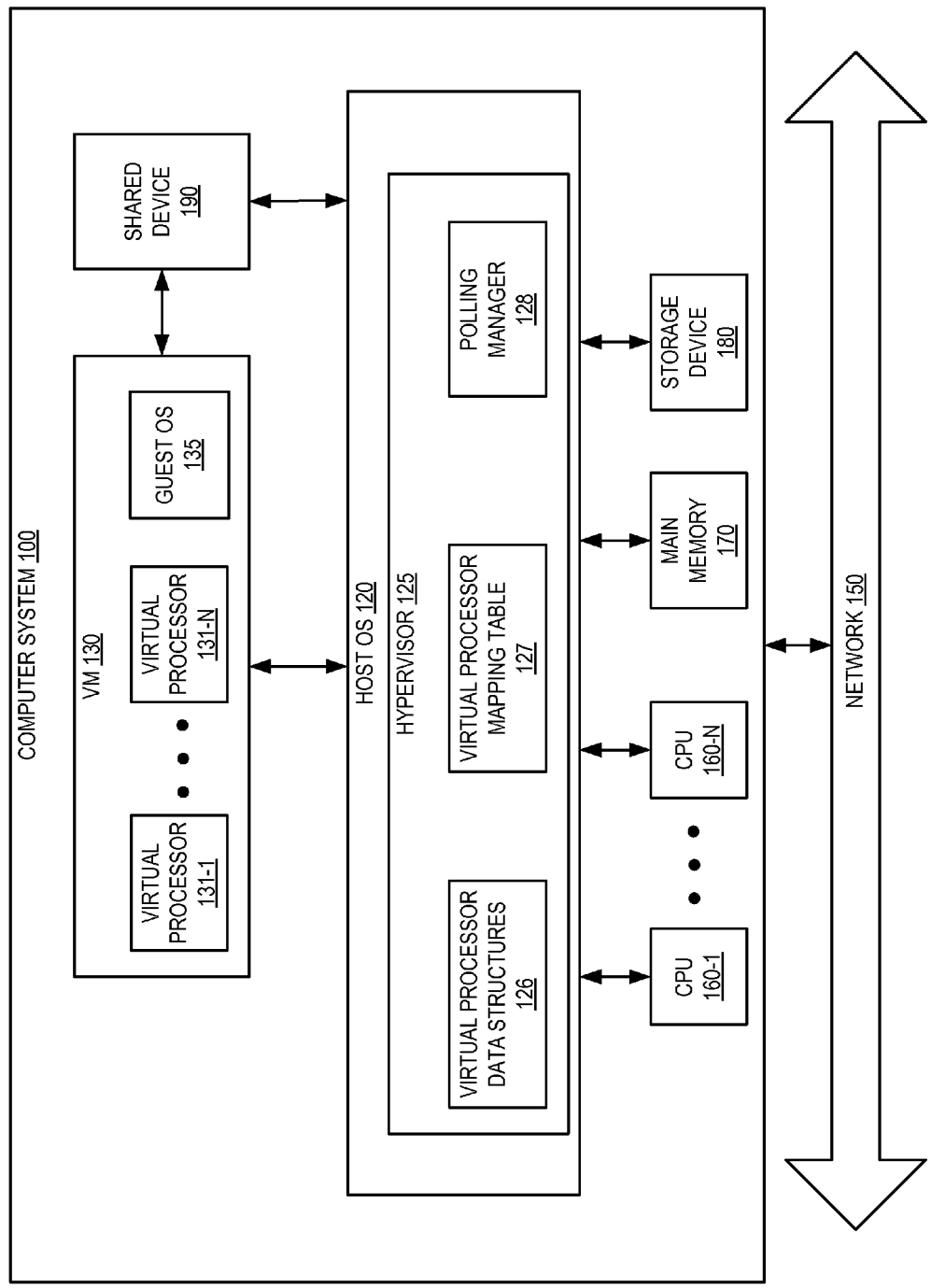
FIG. 1 depicts a high-level component diagram of an example computer system architecture, in accordance with one or more aspects of the present disclosure.

Described herein are methods and systems by which a hypervisor determines whether or not to disable polling of a shared device for requests from a guest operating system (OS). When a guest OS running within a virtual machine (VM) needs to execute a privileged operation (such as an I/O instruction to a physical storage device attached to the host hardware), one way of doing so can be by writing requests to a virtual shared device based. The shared device may be a data structure in a shared memory location that is accessible to both the VM and the host OS. The host OS typically accesses the shared memory to determine whether there are any requests pending from the guest OS, which is referred to as "polling" the shared device. If the host OS processes these requests at a faster rate than that with which the guest OS adds them, continued polling of the shared memory can lead to a waste of CPU resources. CPU resources can be similarly wasted if the host continues polling the shared device after which a guest OS is no longer writing to the shared device. This can occur when any of the virtual processors of the VM have been pre-empted by the host so that the associated physical processor can execute a host related task. Pre-emption is the interruption by the host of the virtual processor without its cooperation in order to perform another task with the intention of resuming execution of the virtual processor at a later time.

VMs can often have multi-threaded tasks that run on all of its virtual processors. For example, a VM may be executing a task on virtual processor A that triggers virtual processor B to write requests to a shared device. If the host pre-empts virtual processor A to execute a host task, then virtual processor A will no longer be triggering virtual processor B to write requests to the shared device. Thus, continued polling of the shared device would waste resources since virtual processor B would not be writing any additional requests to the shared device so long as virtual processor A is pre-empted by the host.

Aspects of the present disclosure address the above noted deficiency by disabling polling if any of the virtual processors of the same virtual machine have been pre-empted by the host. In an illustrative example, the hypervisor identifies a request of a guest OS of a VM that has been associated with a shared device. The shared device may be a data structure in a shared memory location that is accessible to both the VM and the hypervisor. In some implementations, the VM may have a plurality of virtual processors. The hypervisor processes any requests found in the shared device, and subsequently engages in polling of the shared device for additional requests. Upon determining that there are no requests remaining to be processed, the hypervisor can identify each virtual processor of the virtual machine to determine their execution state. If the hypervisor detects that at least one virtual processor of the virtual machine has been pre-empted (e.g., if the host has suspended execution of the virtual processor in order to devote the associated host processor to a host-related task), the hypervisor can disable polling the shared device for new requests. The hypervisor may then notify the guest operating system that polling has been disabled. The hypervisor may notify the guest via, for example, an interrupt request or a message written to a data structure in a shared memory location. The notification may also indicate, to the guest operating system, the reason for disabling the polling (e.g., polling time has exceeded the predetermined threshold, etc.).

Subsequently, the hypervisor may determine whether the execution state of the pre-empted virtual processor changes. For example, the hypervisor may determine that the virtual processor that had been previously pre-empted has resumed running. The hypervisor may then enable polling of the shared device for new requests in response to determining that the virtual processor is no longer pre-empted. In certain implementations, the hypervisor can notify the guest operating system that polling has been enabled. The hypervisor may notify the guest via, for example, an interrupt request or a message written to a data structure in a shared memory location.

In accordance with one example, the hypervisor may determine whether no additional requests of the guest OS are associated with the shared device for a period of time that exceeds a predetermined threshold. The hypervisor may disable polling of the shared device upon determining that the threshold has been met. The threshold value may represent a total amount of time elapsed during polling of a shared device. Alternatively, the threshold value may be a total amount of CPU clock cycles executed during polling of a shared device. The threshold may be defined by an administrator (e.g., via a configuration file, via a graphical user interface, etc.), hard-coded in the hypervisor, or set in any other manner.

In certain implementations, the virtualized environment may be overcommitted, meaning that the number of virtual processors on the VM is equal to the number of physical processors on the host. In this situation, any instance of polling by the hypervisor could lead to a virtual processor being pre-empted, and as a result cause the hypervisor to immediately disable polling. In this situation, the hypervisor can enable polling by assigning the plurality of virtual processors of the virtual machine to a single host processor. The hypervisor may first analyze the load placed by each of the virtual processors of the VM on the host. Upon determining that the load placed by each of the plurality of virtual processors on the host meets a predefined threshold condition, the hypervisor may then identify a single host processor capable of processing the load for all of the virtual processors of that virtual machine collectively. The threshold condition may be implemented as a percentage of CPU load, the total amount of CPU clock cycles executed during a particular time period, or in any similar manner.

For example, the predefined threshold condition may be set such that for a VM with two virtual processors, any virtual processor that exerts a load of less than 25% of the total capacity of the physical processor may be reassigned. Thus, if the hypervisor determines that each of the virtual processors of the VM only places a load of 10% of the capacity of the physical processor, the hypervisor may determine that that the threshold condition for reassignment has been met. The hypervisor may then identify a single host processor capable of processing the load for the plurality of virtual processors of the virtual machine and assign the virtual processors to the identified host processor. Subsequently, the hypervisor can enable polling of the shared device and notify the guest OS that polling has been enabled.

Aspects of the present disclosure are thus capable of limiting CPU usage associated with polling by the host operating system. More particularly, aspects of the present disclosure prevent continued polling of the shared memory from wasting CPU resources in the event that any virtual processor of the VM has been pre-empted.

FIG. 1 depicts a high-level component diagram of an illustrative example of a computer system 100, in accordance with one or more aspects of the present disclosure. One skilled in the art will appreciate that other architectures for computer system 100 are possible, and that the implementation of a computer system utilizing examples of the invention are not necessarily limited to the specific architecture depicted by FIG. 1.

As shown in FIG. 1, the computer system 100 is connected to a network 150 and comprises one or more central processing units (CPUs) 160-1 through 160-N, where N is a positive integer, main memory 170, which may include volatile memory devices (e.g., random access memory (RAM)), non-volatile memory devices (e.g., flash memory) and/or other types of memory devices, and a storage device 180 (e.g., one or more hard disk drives, solid-state drives, etc.). In certain implementations, main memory 170 may be non-uniform access (NUMA), such that memory access time depends on the memory location relative to CPUs 160-1 through 160-N.

The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

Computer system 100 may additionally comprise virtual machine (VM) 130, host operating system (OS) 120, and shared device 190. VM 130 is a software implementation of a machine that executes programs as though it were an actual physical machine. Host OS 120 manages the hardware resources of the computer system and provides functions such as inter-process communication, scheduling, memory management, and so forth. Shared device 190 is a data structure in shared memory accessible to both guest OS 135 of VM 130 and hypervisor 125 of host OS 120.

VM 130 comprises a guest operating system (OS) 135 that handles the execution of applications within the virtual machine, and one or more virtual processors 131-1 through 131-N, where N is a positive integer. One or more virtual processors 131-1 through 131-N may be associated with a shared device 190. Guest OS 135 may write requests to shared device 190 to be processed by host OS 190. It should be noted that although, for simplicity, a single virtual machine 130 is depicted in FIG. 1, computer system 100 may host a plurality of VMs 130.

Host OS 120 may comprise a hypervisor 125, which provides a virtual operating platform for virtual machine 130 and manages its execution. Hypervisor 125 may comprise polling manager 128, virtual processor data structures 126, and virtual processor mapping table 127. It should be noted that in some alternative implementations, hypervisor 125 may be external to host OS 120, rather than embedded within host OS 120, or may replace host OS 120.

Polling manager 128 can identify requests in a shared device 190 of guest OS 135, process the requests, and determine whether continued polling of the shared device should be disabled based on the execution state of the virtual processors associated with VM 130, as described in detail below with respect to FIG. 2. Polling manager 128 may also determine whether polling of the shared device should be re-enabled based on the processing load of all virtual processors of VM 130, as described in detail below with respect to FIG. 3.

Hypervisor 125 can use virtual processor data structures 126 to maintain information regarding virtual processors 131-1 through 131-N of VM 130. Hypervisor 125 may store the execution state of virtual processors 131-1 through 131-N in virtual processor data structures 126 for use by polling manager 128 in determining whether to disable polling of shared device 190. Hypervisor 125 may update virtual processor data structures 126 each time the execution state of any of virtual processors 131-1 through 131-N changes. For example, if the execution state one of the virtual processors changes from running to pre-empted. Hypervisor 125 may also store a unique identifier in virtual processor data structures 126 that maps to a specific virtual processor of virtual processors 131-1 through 131-N for use by polling manager 128. Hypervisor 125 may create separate virtual data structures 126 for each of virtual processors 131-1 through 131-N, or in the alternative, create a single virtual processor data structure 126 for all virtual processors 131-1 through 131-N. Virtual processor data structures 126 may be a memory location within hypervisor 125. Alternatively, virtual processor data structures 126 may be written to a location in storage device 180.

Hypervisor 125 can use virtual processor mapping table 127 to store cross reference information regarding which of the virtual processors 131-1 through 131-N of VM 130 are associated with shared device 190. Hypervisor 125 may store a unique identifier that is associated with each of the virtual processors 131-1 through 131-N, along with an identifier for the shared memory location of the associated shared device 190 for use by polling manager 128. If hypervisor 125 determines that a virtual processor of VM 130 needs to be reassigned to another physical processor as described below in FIG. 3, it may use virtual processor mapping table 127 to assist with identification of eligible physical processors. For example, if a virtual processor is associated with a shared device, and a host processor normally conducts polling of that shared device, then that host processor may not be deemed eligible to assume the load for all virtual processors since it could interfere with polling operations. Virtual processor mapping table 127 may be a memory location within hypervisor 125. Alternatively, virtual processor mapping table 127 may be written to a location in storage device 180.

Figure 2:
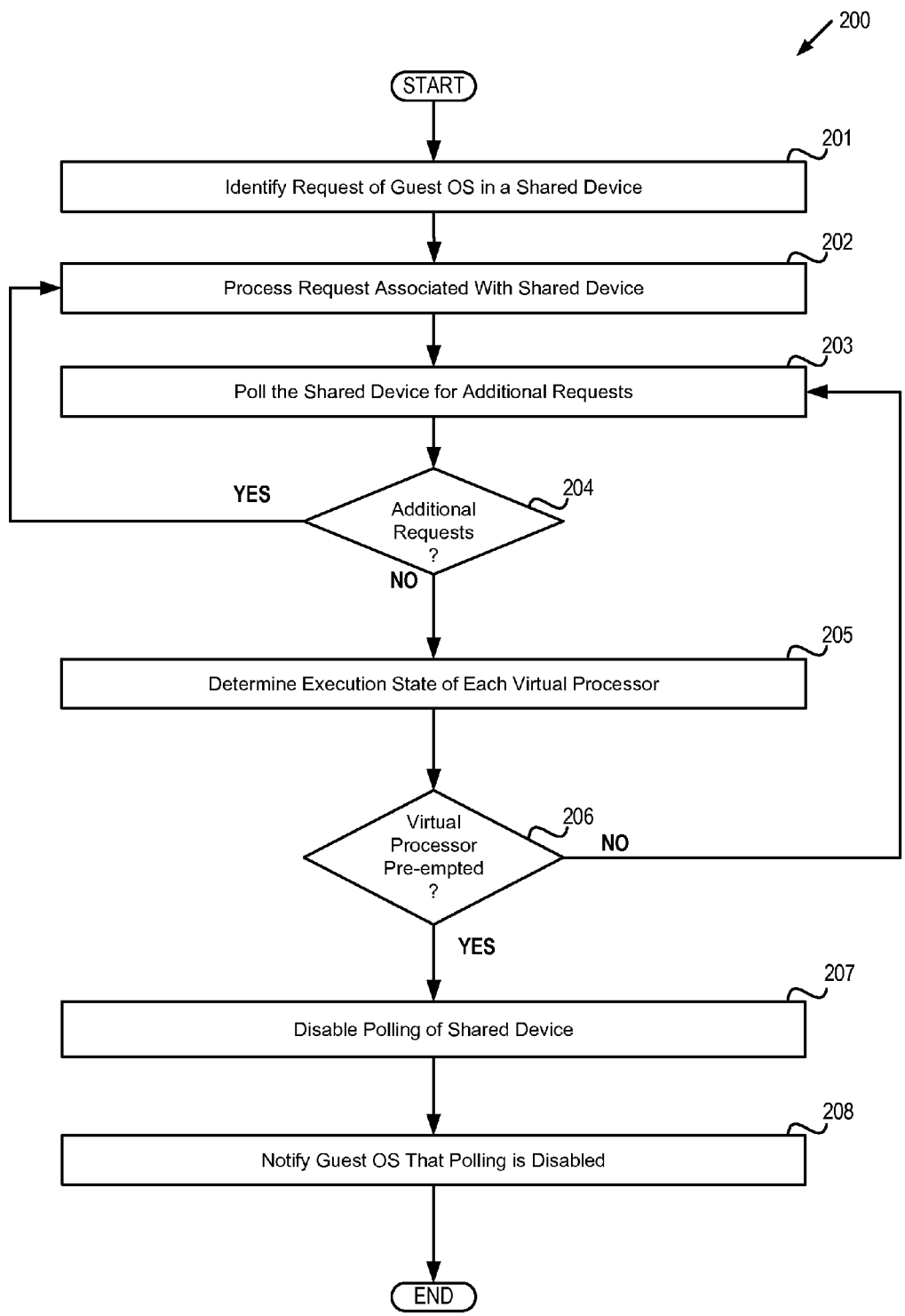
FIG. 2 depicts a flow diagram of a method for disabling polling of a shared device based on the execution states of each virtual processor of a virtual machine, in accordance with one or more aspects of the present disclosure.

FIG. 2 depicts a flow diagram of an example method 200 for disabling polling of a shared device based on the execution states of each virtual processor of a virtual machine. The method may be performed by processing logic that may comprise hardware (circuitry, dedicated logic, etc.), software (such as is run on a general purpose computer system or a dedicated machine), or a combination of both. In one illustrative example, method 200 may be performed by polling manager 128 of hypervisor 125 in FIG. 1. Alternatively, some or all of method 200 might be performed by another machine. It should be noted that blocks depicted in FIG. 2 could be performed simultaneously or in a different order than that depicted.

At block 201, processing logic identifies a request of a guest operating system associated with a shared device. The shared device may be represented by a data structure in shared memory, such as shared device 190 which is accessible to both guest OS 135 of VM 130 and hypervisor 125 in FIG. 1. In some implementations, the VM may have a plurality of virtual processors, such as virtual processors 131-1 through 131-N of VM 130 in FIG. 1. At block 202, processing logic processes the request associated with the shared device. At block 203, processing logic polls the shared device for additional requests of the guest operating system.

At block 204, processing logic determines whether there are additional requests of the guest operating system associated with the shared device to be processed. If processing logic determines that there are additional requests in the shared device to be processed, processing logic returns to block 202 to process the requests and continue polling. Otherwise, execution proceeds to block 205. In one illustrative example, before proceeding to block 205, processing logic may first determine whether no additional requests were associated with the shared device for a period of time that exceeds a predetermined threshold. If processing logic determines that the threshold has not yet been met, execution returns to block 202, otherwise execution proceeds to block 205. In certain implementations, the threshold value may represent a total amount of time elapsed during polling of a shared device. Alternatively, the threshold value may be a total amount of CPU clock cycles executed during polling of a shared device. The threshold may be defined by an administrator (e.g., via a configuration file, via a graphical user interface, etc.), hard-coded in the hypervisor, or set in any other manner.

At block 205, processing logic determines the execution state of each virtual processor of the virtual machine (e.g., the virtual processor is currently running and busy, currently running but idle, not currently running, pre-empted by the host, etc.). The various execution states may be defined by an administrator (e.g., via a configuration file, via a graphical user interface, etc.), hard-coded in polling manager 128 of hypervisor 125 in FIG. 1, or set in any other manner. Processing logic may access a data structure that stores the execution state of the virtual processor such as virtual processor data structures 126 of FIG. 1. In one illustrative example, processing logic can use the unique identifier of the virtual processor from block 205 to access the applicable data structure for the virtual processor. In certain implementations, the data structure may contain the current execution state of the applicable virtual processor.

At block 206, processing logic branches based on the determination of block 205. If processing logic determined that at least one virtual processor of the virtual machine has been pre-empted (e.g., if the host has suspended execution of the virtual processor in order to devote the associated host processor to a host-related task), execution continues to block 207, otherwise execution returns to block 203 to continue polling.

At block 207, processing logic disables polling of the shared device. At block 208, processing logic notifies the guest OS that polling has been disabled. This notification may be made via an interrupt request, or alternatively, via a data structure stored in shared memory. In certain implementations, the notification may also indicate to the guest OS the reason that polling is disabled (e.g., the virtual processor is pre-empted, etc.). After block 208, the method of FIG. 2 terminates.

Figure 3:
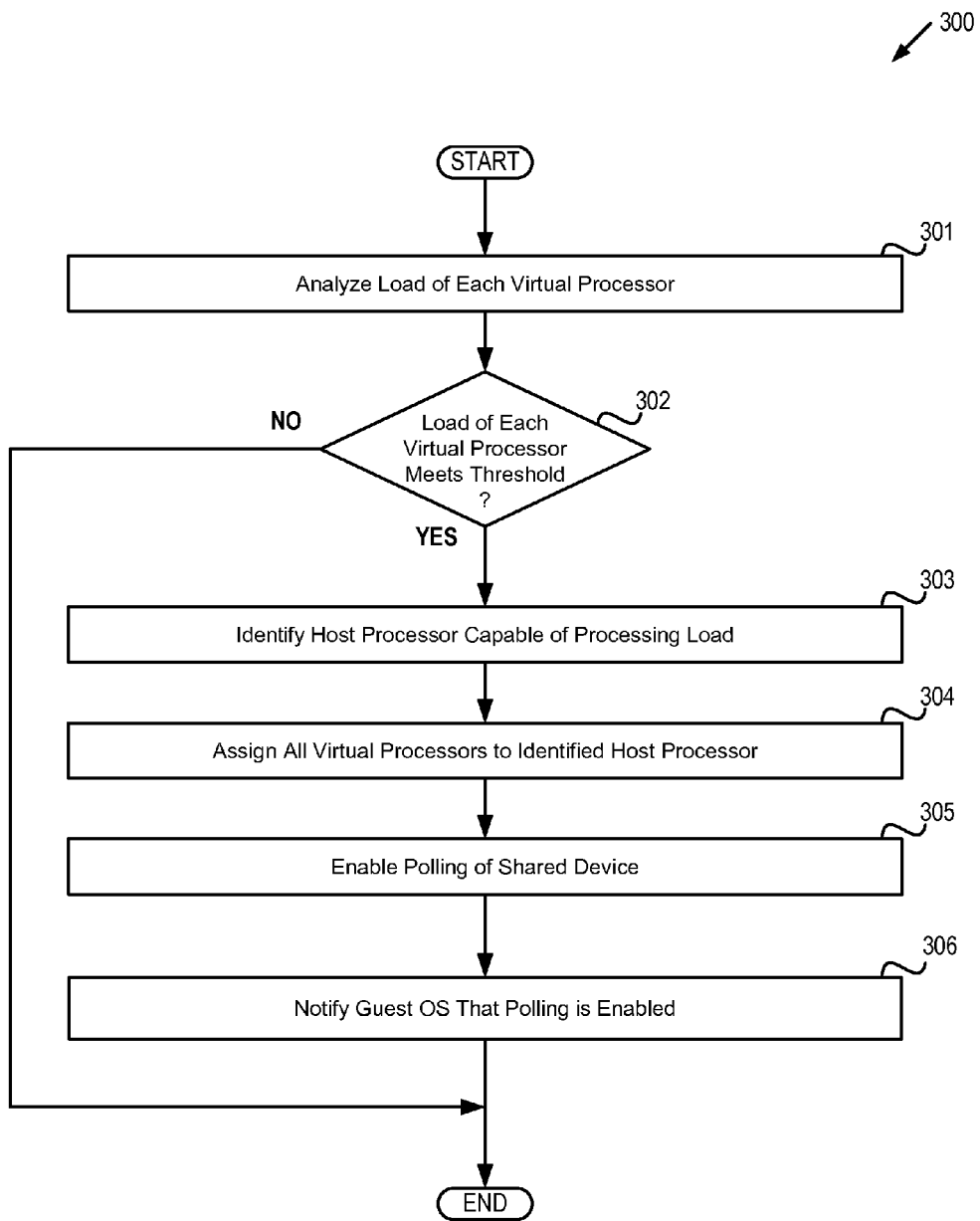
FIG. 3 depicts a flow diagram of a method for enabling polling of a shared device based on the processing load of all virtual processors of a virtual machine, in accordance with one or more aspects of the present disclosure.

FIG. 3 depicts a flow diagram of an example method 300 for enabling polling of a shared device based on the processing load of all virtual processors of a virtual machine. The method may be performed by processing logic that may comprise hardware (circuitry, dedicated logic, etc.), software (such as is run on a general purpose computer system or a dedicated machine), or a combination of both. In one illustrative example, method 300 may be performed by polling manager 128 of hypervisor 125 in FIG. 1. Alternatively, some or all of method 300 might be performed by another machine. It should be noted that blocks depicted in FIG. 3 could be performed simultaneously or in a different order than that depicted.

At block 301, processing logic may first analyze the load placed by each of the virtual processors of the VM on the host. At block 302, processing logic determines whether the load placed by each virtual processor of the VM on the associated physical processor meets a predefined threshold condition. If processing logic determines that the threshold has not yet been met, the method of FIG. 3 terminates, otherwise execution proceeds to block 303. The threshold condition may be implemented as a percentage of CPU load, the total amount of CPU clock cycles executed during a particular time period, or in any similar manner.

For example, the predefined threshold condition may be set such that for a VM with two virtual processors, any virtual processor that exerts a load of less than 25% of the total capacity of the physical processor may reassigned. Thus, if the hypervisor determines that each of the virtual processors of the VM only places a load of 10% of the capacity of the physical processor, the hypervisor may determine that that the threshold condition for reassignment has been met.

At block 303, processing logic may identify a single host processor capable of processing the load for the plurality of the virtual processors of that virtual machine collectively. At block 304, processing logic assigns the plurality of virtual processors to the single host processor identified at block 303. At block 305, processing logic enables polling of the shared device. At block 306, processing logic notifies the guest OS that polling has been enabled. This notification may be made via an interrupt request, or alternatively, via a data structure stored in shared memory. In certain implementations, the notification may also indicate to the guest OS the reason that polling has been enabled. After block 306, the method of FIG. 3 terminates.

Figure 4:
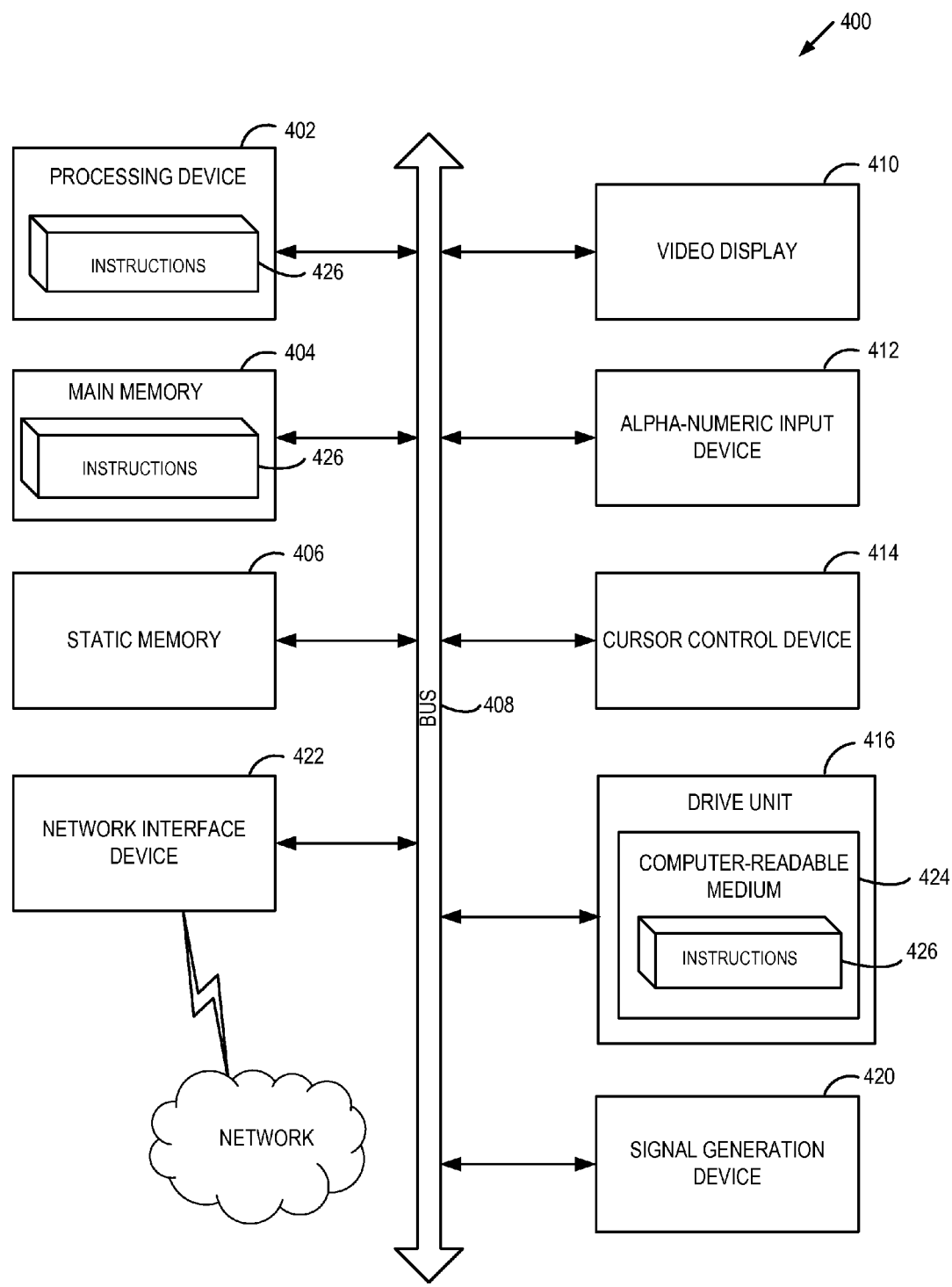
FIG. 4 depicts a block diagram of an illustrative computer system operating in accordance with examples of the invention.

FIG. 4 depicts an example computer system 400 which can perform any one or more of the methods described herein. In one example, computer system 400 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 400 includes a processing system (processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)), and a data storage device 416, which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable medium 424 on which is stored one or more sets of instructions 426 (e.g., instructions corresponding to the methods of FIGS. 2 and 3, etc.) embodying any one or more of the methodologies or functions described herein. Instructions 426 may also reside, completely or at least partially, within the main memory 404 and/or within the processor 402 during execution thereof by the computer system 400, the main memory 404 and the processor 402 also constituting computer-readable media. Instructions 426 may further be transmitted or received over a network via the network interface device 422.

While the computer-readable storage medium 424 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "determining", "allocating", "notifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

What is claimed is:

1. A method comprising:
   identifying, by a processing device executing a hypervisor, a request of a guest operating system of a virtual machine, the request associated with a shared device, the virtual machine having a plurality of virtual processors;
   processing the request of the guest operating system;
   polling the shared device for additional requests of the guest operating system;
   determining that no additional requests of the guest operating system are associated with the shared device;
   disabling, by the processing device executing the hypervisor, polling of the shared device upon determining that an execution state of at least one virtual processor indicates that the at least one virtual processor has been pre-empted, wherein the at least one virtual processor has been pre-empted when the hypervisor has suspended execution of the at least one virtual processor in order to devote an associated host processor to a host-related task;
   notifying the guest operating system of the virtual machine that the polling of the shared device has been disabled upon disabling the polling of the shared device;
   determining whether the execution state of the at least one virtual processor of the virtual machine has changed;
   enabling, by the processing device executing the hypervisor, the polling of the shared device for additional requests upon determining that the execution state of the at least one virtual processor indicates that the at least one virtual processor is not pre-empted; and
   notifying the guest operating system of the virtual machine that the polling of the shared device has been enabled upon enabling the polling of the shared device.

2. The method of claim 1, wherein determining that no additional requests of the guest operating system are associated with the shared device comprises:
   determining, by the hypervisor, that no additional requests of the guest operating system are associated with the shared device for a period of time that exceeds a predetermined threshold.

3. The method of claim 1 further comprising:
   assigning the plurality of virtual processors of the virtual machine to a single host processor;
   enabling the polling of the shared device for the additional requests; and
   notifying the guest operating system of the virtual machine that the polling of the shared device has been enabled upon enabling the polling of the shared device.

4. The method of claim 3, wherein assigning the plurality of virtual processors of the virtual machine to the single host processor comprises:
   analyzing a load placed by each of the plurality of virtual processors on the host;
   determining that the load placed by each of the plurality of virtual processors on the host meets a predefined threshold condition;
   identifying the single host processor capable of processing the load for the plurality of virtual processors of the virtual machine; and
   assigning the plurality of virtual processors of the virtual machine to the identified single host processor.

5. The method of claim 1 wherein the shared device is associated with a shared memory space between the virtual machine and the hypervisor.

6. A computing apparatus comprising:
   a memory; and
   a processing device, operatively coupled to the memory, to execute a hypervisor to:
      identify a request of a guest operating system of a virtual machine, the request associated with a shared device, the virtual machine having a plurality of virtual processors;
      process the request of the guest operating system;
      poll the shared device for additional requests of the guest operating system; and
      determine that no additional requests of the guest operating system are associated with the shared device;
      disable, by the processing device executing the hypervisor, the polling of the shared device for the additional requests upon determining that an execution state of at least one virtual processor indicates that the at least one virtual processor has been pre-empted, wherein the at least one virtual processor has been pre-empted when the hypervisor has suspended execution of the at least one virtual processor in order to devote an associated host processor to a host-related task;

notify the guest operating system of the virtual machine that polling has been disabled upon disabling polling of the shared device;

determine whether the execution state of the at least one virtual processor of the virtual machine has changed;

enable, by the processing device executing the hypervisor, the polling of the shared device for additional requests upon determining that the execution state of the at least one virtual processor indicates that the at least one virtual processor not pre-empted; and notify the guest operating system of the virtual machine that the polling of the shared device has been enabled upon enabling the polling of the shared device.

7. The apparatus of claim 6, wherein to determine that no additional requests of the guest operating system are associated with the shared device, the processing device is to:

determine, by the hypervisor, that no additional requests of the guest operating system are associated with the shared device for a period of time that exceeds a predetermined threshold.

8. The apparatus of claim 6 wherein the processing device is further to:

assign the plurality of virtual processors of the virtual machine to a single host processor;

enable the polling of the shared device for the additional requests; and notify the guest operating system of the virtual machine that the polling of the shared device has been enabled upon enabling the polling of the shared device.

9. The apparatus of claim 8, wherein to assign the plurality of virtual processors of the virtual machine to the single host processor, the processing device is to:

analyze a load placed by each of the plurality of virtual processors on the host;

determine that the load placed by each of the plurality of virtual processors on the host meets a predefined threshold condition;

identify the single host processor capable of processing the load for the plurality of virtual processors of the virtual machine; and assign the plurality of virtual processors of the virtual machine to the identified single host processor.

10. The apparatus of claim 6 wherein the shared device is associated with a shared memory space between the virtual machine and the hypervisor.

11. A non-transitory computer readable storage medium, having instructions stored therein, which when executed by a processing device of a computer system, cause the processing device to:

identify, by the processing device executing a hypervisor, a request of a guest operating system of a virtual machine, the request associated with a shared device, the virtual machine having a plurality of virtual processors;

process the request of the guest operating system;

poll the shared device for additional requests of the guest operating system;

determine that no additional requests of the guest operating system are associated with the shared device;

disable, by the processing device executing the hypervisor, the polling of the shared device upon determining that an execution state of at least one virtual processor indicates that the at least one virtual processor has been pre-empted, wherein the at least one virtual processor has been pre-empted when the hypervisor has suspended execution of the at least one virtual processor in order to devote an associated host processor to a host-related task;

notify the guest operating system of the virtual machine that polling has been disabled in response to disabling polling of the shared device;

determine whether the execution state of the at least one virtual processor of the virtual machine has changed;

enable, by the processing device executing the hypervisor, polling the shared device for requests in response to determining that the at least one virtual processor is not pre-empted; and notify the guest operating system of the virtual machine that polling has been enabled upon enabling polling of the shared device.

12. The non-transitory computer readable storage medium of claim 11, wherein to determine that no additional requests of the guest operating system are associated with the shared device, the processing device is to:

determine that no additional requests of the guest operating system are associated with the shared device for a period of time that exceeds a predetermined threshold.

13. The non-transitory computer readable storage medium of claim 11, wherein the processing device is further to:

assign the plurality of virtual processors of the virtual machine to a single host processor;

enable the polling of the shared device for the additional requests; and notify, by the hypervisor, the guest operating system of the virtual machine that the polling of the shared device has been enabled upon enabling the polling of the shared device.

14. The non-transitory computer readable storage medium of claim 13, wherein to assign the plurality of virtual processors of the virtual machine to the single host processor, the processing device is to:

analyze a load placed by each of the plurality of virtual processors on the host;

determine that the load placed by each of the plurality of virtual processors on the host meets a predefined threshold condition;

identify the single host processor capable of processing the load for the plurality of virtual processors of the virtual machine; and assign the plurality of virtual processors of the virtual machine to the identified single host processor.

15. The non-transitory computer readable storage medium of claim 11 wherein the shared device is associated with a shared memory space between the virtual machine and the hypervisor.

* * * * *

UNITED STATES PATENT AND TRADEMARK OFFICE
CERTIFICATE OF CORRECTION

PATENT NO. : 9,766,917 B2  Page 1 of 1
APPLICATION NO. : 14/527661
DATED : September 19, 2017
INVENTOR(S) : Michael S. Tsirkin It is certified that error appears in the above-identified patent and that said Letters Patent is hereby corrected as shown below:

In the Claims

In Claim 6, Column 10, Line 60, delete "and"

Signed and Sealed this
Nineteenth Day of November, 2019

Andrei Iancu
*Director of the United States Patent and Trademark Office*